United States Patent
Hu et al.

(10) Patent No.: US 11,790,692 B2
(45) Date of Patent: Oct. 17, 2023

(54) METHOD FOR BEHAVIOUR RECOGNITION, ELECTRONIC EQUIPMENT, AND STORAGE MEDIUM

(71) Applicants: XIAOMI TECHNOLOGY (WUHAN) CO., LTD., Wuhan (CN); BEIJING XIAOMI PINECONE ELECTRONICS CO., LTD., Beijing (CN)

(72) Inventors: Xian Hu, Wuhan (CN); Wei Deng, Wuhan (CN); Jun Yi, Wuhan (CN)

(73) Assignees: Xiaomi Technology (Wuhan) Co., Ltd., Wuhan (CN); Beijing Xiaomi Pinecone Electronics Co., Ltd., Beijing (CN)

( * ) Notice: Subject to any disclaimer, the term of this patent is extended or adjusted under 35 U.S.C. 154(b) by 8 days.

(21) Appl. No.: 17/334,993

(22) Filed: May 31, 2021

(65) Prior Publication Data
US 2022/0164568 A1 May 26, 2022

(30) Foreign Application Priority Data
Nov. 20, 2020 (CN) .......................... 202011311575.7

(51) Int. Cl.
*G06V 40/00* (2022.01)
*G06V 40/16* (2022.01)
(Continued)

(52) U.S. Cl.
CPC ............ *G06V 40/161* (2022.01); *G06F 18/22* (2023.01); *G06V 10/17* (2022.01); *G06V 40/165* (2022.01);
(Continued)

(58) Field of Classification Search
CPC ...... G06V 20/49; G06V 20/46; G06V 10/761; G06V 20/53; G06K 9/6215
See application file for complete search history.

(56) References Cited

U.S. PATENT DOCUMENTS 9,269,215 B2 * 2/2016 Thompson .......... G07F 17/3223
9,830,708 B1 11/2017 Poliakov
(Continued)

FOREIGN PATENT DOCUMENTS

CN 103677267 A 3/2014
CN 105893981 A 8/2016
(Continued)

OTHER PUBLICATIONS

Hirotake Yamazoe et al: "Remote gaze estimation with a single camera based on facial-feature tracking without special calibration actions" Eye Tracking Research & Applications Proceedings: ETRA 2008: Eye Trackingresearch and Applications Symposium];Savanna, Georgia, USA, Mar. 26-28, 2008, ACM, New York, NY,Mar. 26, 2008 (Mar. 26, 2008), pp. 245-250,XP058345562DOI: 10.1145/1344471.1344527ISBN: 978-1-59593-982-1 * the whole document *, 6 pages.
(Continued)

*Primary Examiner* — Emily C Terrell
*Assistant Examiner* — Ahmed A Nasher
(74) *Attorney, Agent, or Firm* — Arch & Lake LLP

(57) ABSTRACT

A method and device for behavior recognition are provided. According the present disclosure, an image is collected. It is detected whether the image includes a face. When the image includes a face, it is determined whether the face in the image is a face with closed eyes. When the face in the image is not with closed eyes, a distance between the face and an image collecting unit is computed. A maximum field of vision of a target to which the face belongs is determined
(Continued)

according to the distance and a parameter of the image collecting unit. It is determined, according to the maximum field of vision, whether the target has a set behavior.

14 Claims, 3 Drawing Sheets

(51) Int. Cl.
| | |
|---|---|
| *G06V 40/19* | (2022.01) |
| *G06V 40/18* | (2022.01) |
| *G06V 40/20* | (2022.01) |
| *G06F 18/22* | (2023.01) |
| *G06V 10/10* | (2022.01) |

(52) U.S. Cl.
CPC ............ *G06V 40/171* (2022.01); *G06V 40/18* (2022.01); *G06V 40/19* (2022.01); *G06V 40/193* (2022.01); *G06V 40/20* (2022.01)

(56) References Cited

U.S. PATENT DOCUMENTS

| | | | |
|---|---|---|---|
| 10,027,888 B1* | 7/2018 | Mackraz | ............... G06V 10/25 |
| 10,102,634 B1 | 10/2018 | Poliakov | |
| 10,346,985 B1 | 7/2019 | Poliakov | |
| 10,535,139 B1 | 1/2020 | Poliakov | |
| 10,607,347 B1 | 3/2020 | Poliakov | |
| 11,042,994 B2* | 6/2021 | Stent | ............... G06F 3/012 |
| 2012/0169596 A1* | 7/2012 | Zhuang | ............... A61B 3/113 |
| | | | 345/158 |
| 2015/0049004 A1* | 2/2015 | Deering | ............... H04N 13/344 |
| | | | 345/8 |
| 2015/0050628 A1 | 2/2015 | Mori et al. | |
| 2015/0116206 A1 | 4/2015 | Irie | |
| 2019/0096055 A1 | 3/2019 | Namiki | |
| 2020/0249009 A1* | 8/2020 | Heymer | ............... G01B 11/002 |
| 2022/0132023 A1 | 4/2022 | Kagaya et al. | |

FOREIGN PATENT DOCUMENTS

| | | |
|---|---|---|
| CN | 107272194 A | 10/2017 |
| CN | 108040291 A | 5/2018 |
| CN | 109976506 A | 7/2019 |
| CN | 110738142 A | 1/2020 |
| CN | 110780739 A | 2/2020 |
| CN | 111016785 A | 4/2020 |
| CN | 111796874 A | 10/2020 |
| EP | 2485118 A1 | 8/2012 |
| JP | 2018004756 A | 1/2018 |
| WO | 2015172514 A1 | 11/2015 |
| WO | WO-2022041396 A1 * | 3/2022 |

OTHER PUBLICATIONS

Supplementary European Search Report in the European application No. 21176736.3, dated Nov. 16, 2021, 9 pages.
Zhang X, Sugano Y, Fritz M, et al. "MPIIGaze: Real-World Dataset and Deep Appearance-Based Gaze Estimation[J]". IEEE Trans Pattern Anal Mach Intell, 2017, IEEE, (14p).
Supplementary European Search Report in the European application No. 21176701.7, dated Nov. 16, 2021, (7p).
YingYu Ji et al., "Fatigue State Detection Based on Multi-Index Fusion and State Recognition Network", Digital Object Identifier 10.1109/ACCESS.2019.2917382, IEEE Access,(12p).
Kenji Miyoshi et al.,"Detection of Dangerous Behavior by Estimation of Head Pose and Moving Direction", Downloaded on Dec. 5, 2022 at 20:02:50 UTC from IEEE Xplore, (6p).
Zhizhi Guo et al., "A new algorithm detects pilot fatigue based on machine vision", 2014,Downloaded on Dec. 5, 2022 at 20:16:19 UTC from IEEE Xplore, (6p).
Wanghua Deng et al., "Real-Time Driver-Drowsiness Detection System Using Facial Features", Digital Object Identifier 10.1109/ACCESS.2019.2936663, IEEE Access,(12p).
First Office Action issued in the U.S. Appl. No. 17/334,965, dated Jan. 6, 2023, (59p).
Xu, Yuanyuan, et al., "CenterFace: Joint Face Detection and Alignment Using Face as Point" Hindawi Scientific Programming, vol. 2020, Article ID 7845384, https://doi.org/10.1155/2020/7845384, (8p).
Guo, Xiaojie et al., "PFLD: A Practical Facial Landmark Detector" CVPR 2019, (11p).
Cortacero, Kévin, et al., "RT-BENE: A Dataset and Baselines for Real-Time Blink Estimation in Natural Environments", IEEE International Conference on Computer Vision Workshops , 2019, (10p).
Ruiz, Nataniel, et al., "Fine-Grained Head Pose Estimation Without Keypoints", 2018 IEEE/CVF Conference on Computer Vision and Pattern Recognition Workshops (CVPRW) IEEE, 2018, (10p).

* cited by examiner

METHOD FOR BEHAVIOUR RECOGNITION, ELECTRONIC EQUIPMENT, AND STORAGE MEDIUM

CROSS-REFERENCE TO RELATED APPLICATION

This application is based on and claims priority to Chinese Application No. 202011311575.7 filed on Nov. 20, 2020, the content of which is hereby incorporated by reference in its entirety for all purposes.

BACKGROUND

Smart interaction is a mode of interaction between a human and smart electronic equipment where an operating instruction is generated based on user behavior detection. A user behavior includes a multi-modal behavior such as recognizing a face, a voice, an expression, a gesture, etc. A user behavior is detected, sensed, and interpreted to generate a operating instruction, so as to control providing a precise matching response by equipment, improving interaction experience comprehensively. Currently, in face recognition, accuracy in expression or behavior recognition fails to meet a corresponding requirement.

SUMMARY

The present disclosure may relate to interaction control technology based on a smart instruction. The present disclosure provides a method for behavior recognition, electronic equipment, and a storage medium.

According to a first aspect of the present disclosure, there is provided a method for behavior recognition, including: collecting an image, by an image collecting unit; detecting whether the image comprises a face; in response to the image comprising a face, determining whether the face in the image is a face with closed eyes, wherein the face in the image is a face of a target; in response to determining that the face in the image is not with closed eyes, computing a distance between the face and the image collecting unit; determining a maximum field of vision of the target according to the distance and a parameter of the image collecting unit; and determining whether the target has a set behavior according to the maximum field of vision.

According to a second aspect of the present disclosure, there is provided electronic equipment including a processor and a memory for storing processor executable instructions. The processor is configured to implement: collecting an image, by an image collecting unit; detecting whether the image comprises a face; in response to the image comprising a face, determining whether the face in the image is a face with closed eyes, wherein the face in the image is a face of a target; in response to determining that the face in the image is not with closed eyes, computing a distance between the face and the image collecting unit; determining a maximum field of vision of the target according to the distance and a parameter of the image collecting unit; and determining whether the target has a set behavior according to the maximum field of vision.

According to a third aspect of the present disclosure, there is provided a non-transitory computer-readable storage medium having stored therein instructions which, when executed by a processor of electronic equipment, allow the electronic equipment to implement: collecting an image, by an image collecting unit; detecting whether the image comprises a face; in response to the image comprising a face, determining whether the face in the image is a face with closed eyes, wherein the face in the image is a face of a target; in response to determining that the face in the image is not with closed eyes, computing a distance between the face and the image collecting unit; determining a maximum field of vision of the target according to the distance and a parameter of the image collecting unit; and determining whether the target has a set behavior according to the maximum field of vision.

It should be understood that the general description above and the detailed description below are illustrative and explanatory only, and do not limit the present disclosure.

BRIEF DESCRIPTION OF THE DRAWINGS

The accompanying drawings, which are incorporated in and form a part of this specification, illustrate examples consistent with the present disclosure and, together with the description, serve to explain the principles of the present disclosure.

DETAILED DESCRIPTION

Figure 1:
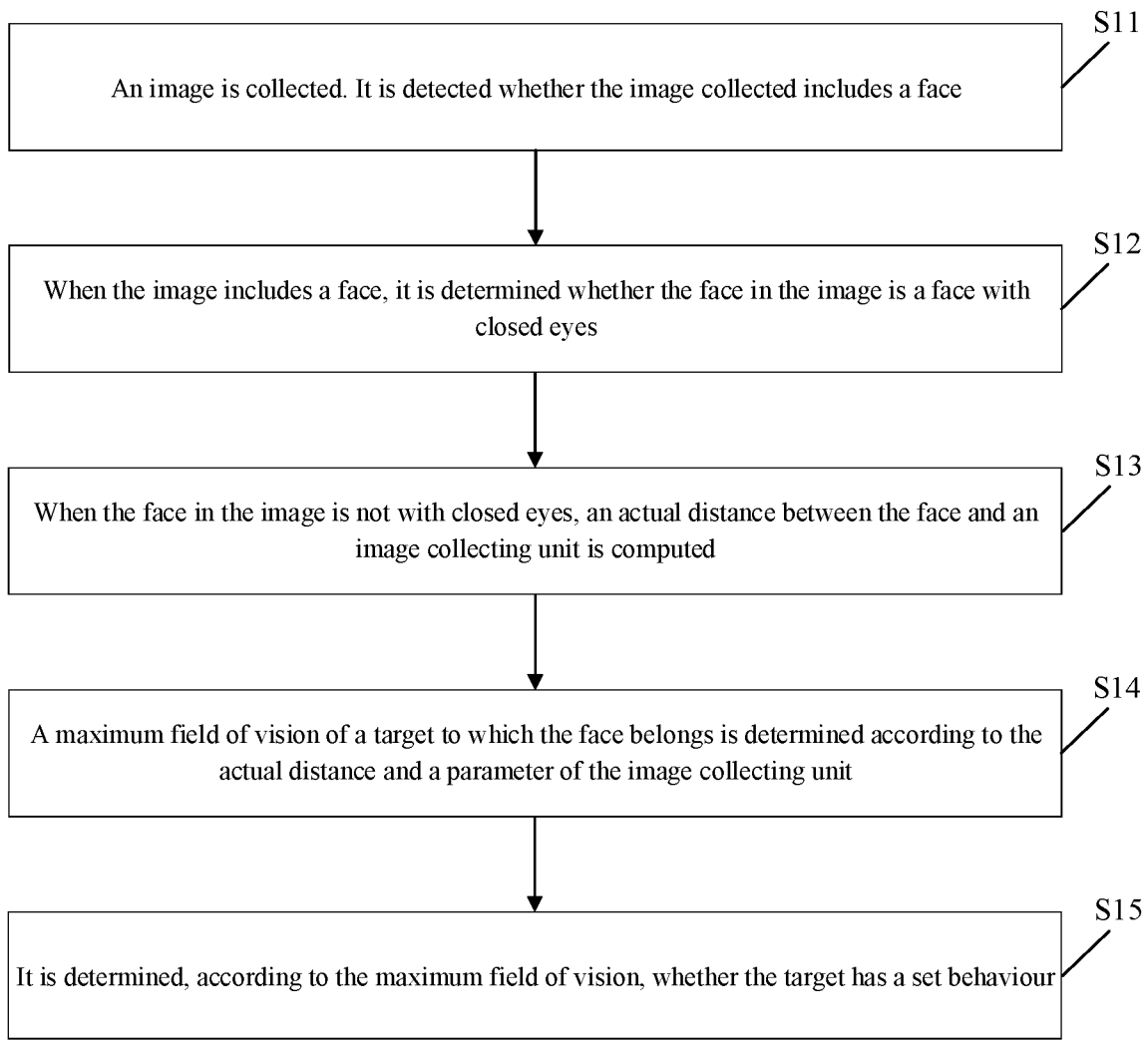
FIG. 1 is a flowchart of a method for behavior recognition according to one or more examples of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the subject disclosure. Rather, they are merely examples of the apparatus and method in accordance with certain aspects herein as recited in the accompanying claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

FIG. 1 is a flowchart of a method for behavior recognition according to an example of the present disclosure. As shown in FIG. 1, a method for behavior recognition according to an example of the present disclosure includes steps as follows.

In S11, an image is collected. It is detected whether the image includes a face.

The technical solution of examples of the present disclosure is applicable to a scene in which electronic equipment such as a smart speaker, a voice robot, etc., is smartly operated. Of course, the target to be operated may be electronic equipment such as a mobile phone, a notebook, a tablet computer, a game machine, etc. After a user behavior recognition application of examples of the present disclosure has been installed in the electronic equipment, an operating instruction may be generated corresponding to recognition of a user behavior, to operate the electronic equipment.

In examples of the present disclosure, an image is collected through a camera, etc., installed on electronic equipment, to collect a face image of an operator, to analyze the face image to determine a set behavior of the user, and generate an operating instruction corresponding to the set behavior of the user, so that the operator can control the electronic equipment without manually operating the electronic equipment.

In examples of the present disclosure, the camera of the electronic equipment captures an image in real time, or captures an image after detecting a corresponding event, such as activating an image collecting mode after detecting an ambient sound exceeding a set decibel. A collection interval for capturing images may be set as needed and according to processor performance. For example, an image may be captured every 0.5 seconds, 0.25 seconds, or 1 second.

It may be determined whether a captured image includes a face. That is, it may be determined whether face information can be detected from the image captured by the camera. Specifically, based on attribute information of pixels in the image, such as contrast, gray scale, etc., the image may be searched for some pixel regions matching a face feature, to determine whether the image includes a face image.

In examples of the present disclosure, a face in an image collected may be detected through a CenterFace network, to determine whether a face image is included.

The technical solution of examples of the present disclosure is more applicable to electronic equipment such as a smart speaker, a smart robot, etc. Image collection is performed using a camera installed on the electronic equipment, and it is determined whether the image includes a face.

In S12, when the image includes a face, it is determined whether the face in the image is a face with closed eyes.

In examples of the present disclosure, after determining a face image in an image input by the user, a feature point in the face has to be identified in order to identify the face image, and determine whether the operator has generated the set behavior. In examples of the present disclosure, a feature point in a face mainly includes a face feature point such as an eye, a nose tip, a mouth corner point, an eyebrow, a cheek, etc., and a contour point of eyes, a nose, lips, eyebrows, cheeks, etc. Of course, if the image includes an image such as an ear, etc., the ear of the face and contour points of the ear may be determined as feature points of the face.

If there is any face, the any face image may be cut out according to a face detection box acquired by face detection. On the basis of face detection, feature point positioning may be performed on a cut out face image using an existing face feature point positioning algorithm, such as a Practical Facial Landmark Detectorlink (PFLD) network, to locate key feature points of the face automatically.

In examples of the present disclosure, it is also possible to perform pose correction on the cut out face image. For example, the face image may be corrected using determined face feature point coordinates. Face pose correction may disclose whether the face in the face image is with closed eyes, greatly improving accuracy in closed-eye detection, improving accuracy in face pose estimation.

For each corrected face, a rectangle passing through four feature points respectively at two corners (i.e., left and right corners) of an eye, a highest point of an upper eyelid of the eye, and a lowest point of a lower eyelid of the eye, is connected according to coordinates of the four feature points. A left eye image and a right eye image are cut out according to the rectangle. In examples of the present disclosure, closed-eye detection is performed respectively on the left eye image and the right eye image cut out through a closed-eye detection method of Real-Time Blink Estimation in Natural Environments (RT-BENE) in a natural environment. The result of the closed-eye detection is whether the eyes are closed. If the result of closed-eye detection is that the left eye and the right eye are closed at the same time, the face is considered to be a closed-eye face, and it is determined that the face does not gaze at the target to be operated, and no subsequent step is performed. It is continued to perform a subsequent processing step for another face image, i.e., an open-eye face image.

In examples of the present disclosure, ruling out a closed-eye face image can reduce a misjudgment of face detection of a user behavior, increasing accuracy in operating instruction generation, as well as avoiding unnecessary computation.

In S13, when the face in the image is not with closed eyes, a distance between the face and an image collecting unit is computed.

In examples of the present disclosure, the distance between the face and the image collecting unit may be computed as follows. A size of a face image may be determined. The distance between the face of the target and the image collecting unit may be computed based on the size of the face image and a resolution of a display unit of the image collecting unit.

Specifically, the coordinates of the feature points of pupils of the left eye and the right eye are denoted as $(l_x, l_y)$ and $(r_x, r_y)$, respectively. The coordinates of the midpoint of the line connecting the pupils of the left eye and the right eye are computed, specifically as follows.

$$\begin{cases} E_x = (l_x + r_x)/2, \\ E_y = (l_y + r_y)/2 \end{cases}$$

$(E_x, E_y)$ denotes the coordinates of the midpoint of the line connecting the pupils of the left and right eyes, in units of pixels.

For the face image cut out, the width and height of a face are denoted by w and h, respectively, in units of pixels. The resolution of the screen of the target to be operated is known. The width and height of the resolution of the screen of the target to be operated are denoted by $w_0$ and $h_0$, respectively, in units of pixels. Then, the actual straight-line distance between the eyes and the target to be operated may be computed approximately using the width and height of the face and the resolution of the target to be operated according to an engineering experience formula, specifically as follows.

$$dist \frac{18840}{\max\left(w \times \frac{1436}{1920} \times \frac{1920}{\max(w_0, h_0)}, h \times \frac{1080}{1440} \times \frac{1920}{\max(w_0, h_0)}\right)} - 8.85$$

dist denotes the actual straight-line distance between the eyes and the target to be operated, in units of cm. An actual test verifies that the error in the computation precision of the formula is less than 10 cm, meeting a requirement on the computation precision.

The dimension of the distance dist is converted into units of pixels, acquiring $E_d$, with a computation formula as follows.

$$E_d = dist \times \frac{w_0}{w_a}$$

$E_d$ denotes the actual straight-line distance between the eyes and the target to be operated, in units of pixel. $w_a$ is the actual width of the target to be operated, such as a smart speaker, in cm. $w_0$ is the lateral resolution of the screen of the target to be operated.

In S14, a maximum field of vision of a target to which the face belongs is determined according to the distance and a parameter of the image collecting unit.

In examples of the present disclosure, the image collecting unit may be a camera or other sensors configured to collect images, etc. The image collecting unit may be provided on a target to be operated, such as a smart speaker, and the image collecting unit is a fixed accessory on the target to be operated, such as the smart speaker, for collecting an image to automatically generate an associated operating instruction, such as smart control such as face recognition.

In an example of the present disclosure, the maximum field of vision of the target to which the face belongs may be determined according to the distance and the parameter of the image collecting unit as follows.

A field of view of the image collecting unit may be computed according to the parameter of the image collecting unit. Location information of eyes of the face may be acquired. Coordinate information of a midpoint of a line connecting pupils of a left eye and a right eye may be determined. Here, the parameter of the image collecting unit may include a parameter such as a focal length of a camera, a physical height and a physical width of a sensor of the camera.

A maximum field of vision of the target in a horizontal direction and a maximum field of vision of the target in a vertical direction may be computed respectively based on the coordinate information, the size of the face, the field of view, a size of a target to be operated, and the distance.

After the maximum field of vision in the horizontal direction and the maximum field of vision in the vertical direction have been computed, the maximum field of vision in the horizontal direction may be expanded by a first angular range. The maximum field of vision in the vertical direction may be expanded by a second angular range. Here, the first angular range and the second angular range are determined based on an empirical value. That is, considering capability of sideway vision of the human eyes, the field of vision in ahead-up state is expanded appropriately based on the maximum field of vision in the horizontal direction and the maximum field of vision in the vertical direction of the human eyes.

Specifically, the field of view of a camera on a smart target to be operated is computed according to a parameter of the camera as follows.

$$\begin{cases} \theta_h = 2\arctan\left(\frac{w_s}{2f}\right) \\ \theta_v = 2\arctan\left(\frac{h_s}{2f}\right) \end{cases}$$

The $\theta_h$ denotes the field of view of the camera in the horizontal direction. The $\theta_v$ denotes the field of view of the camera in the vertical direction of the camera. The $w_s$ and the $h_s$ denote the width and height of the sensor of the camera, respectively. The f denotes the focal length of the camera.

The maximum field of vision of the face, i.e., the angular range of the line of sight in which the face at a location may keep seeing the target to be operated, is computed using the field of view of the camera as computed above. Due to complication such as sideway vision of the human eyes, with examples of the present disclosure, the maximum field of vision of the face in the head-up state may be computed first, as follows.

The field of vision in the horizontal direction is computed as:

$$\begin{cases} Yaw_1 = \dfrac{\arctan\left(\dfrac{\text{abs}\left(E_x - \dfrac{w}{2}\right)}{\dfrac{w}{2}} * dist^* \tan(\theta_h) + \dfrac{w_a}{2}\right)}{dist} \\ Yaw_2 = \dfrac{\arctan\left(\dfrac{\text{abs}\left(E_x - \dfrac{w}{2}\right)}{\dfrac{w}{2}} * dist^* \tan(\theta_h) + \dfrac{w_a}{2}\right)}{dist} \end{cases}$$

The $Yaw_1$ and the $Yaw_2$ respectively denote values of the left boundary and the right boundary of the maximum range an operator can see in the horizontal direction. The $E_x$ denotes the abscissa of the midpoint of the line connecting pupils of the left eye and the right eye. The dist denotes the actual straight-line distance between the face and the target to be operated. The $\theta_h$ denotes the field of view of the camera in the horizontal direction. The $w_a$ denotes the actual width of the target to be operated.

The maximum field of vision of the face in the horizontal direction at present is to be further determined according to values of the left boundary and the right boundary of the maximum range, specifically as follows.

$$Yaw_{min} = \begin{cases} -Yaw_2, & E_x - \dfrac{w}{2} > 0 \\ Yaw_1, & E_x - \dfrac{w}{2} < 0 \end{cases}$$

$$Yaw_{max} = \begin{cases} -Yaw_1, & E_x - \dfrac{w}{2} > 0 \\ Yaw_2, & E_x - \dfrac{w}{2} < 0 \end{cases}$$

Thus, the maximum field of vision in the horizontal direction of the human eyes is ($Yaw_{min}$, $Yaw_{max}$).

The field of vision in the vertical direction is computed as:

$$\begin{cases} Pitch_1 = \dfrac{\arctan\left(\dfrac{\text{abs}\left(E_y - \dfrac{h}{2}\right)}{\dfrac{h}{2}} * dist^* \tan(\theta_v) - \dfrac{h_a}{2}\right)}{dist} \\ Pitch_2 = \dfrac{\arctan\left(\dfrac{\text{abs}\left(E_y - \dfrac{h}{2}\right)}{\dfrac{h}{2}} * dist^* \tan(\theta_v) + \dfrac{h_a}{2}\right)}{dist} \end{cases}$$

The $Pitch_1$ and the $Pitch_2$ respectively denote values of the left boundary and the right boundary of the maximum range an operator can see in the vertical direction. The $E_y$ denotes the ordinate of the midpoint of the line connecting pupils of the left eye and the right eye. The dist denotes the actual straight-line distance between the face and the target to be operated. The $\theta_v$ denotes the field of view of the camera in the vertical direction. The $h_a$ denotes the actual height of the target to be operated.

The maximum field of vision of the face in the vertical direction at present is to be further determined according to values of the left boundary and the right boundary of the maximum field of vision of the human eyes as follows.

$$Pitch_{min} = \begin{cases} -Pitch_2, & E_y - \dfrac{h}{2} > 0 \\ Pitch_1, & E_y - \dfrac{h}{2} < 0 \end{cases}$$

$$Pitch_{max} = \begin{cases} -Pitch_1, & E_y - \dfrac{h}{2} > 0 \\ Pitch_2, & E_y - \dfrac{h}{2} < 0 \end{cases}$$

Thus, the maximum field of vision in the vertical direction of the human eyes is ($Pitch_{min}$, $Pitch_{max}$).

A maximum field of vision of the target to which the face in the image belongs may be determined by considering a sideway vision scene.

Considering an actual scene of sideway vision of the human eyes, the maximum field of vision in the horizontal direction and the maximum field of vision in the vertical direction as computed may be expanded by a certain angular range, and the expanded maximum fields of vision may be taken as the maximum field of vision in the horizontal direction and the maximum field of vision in the vertical direction in case of sideway vision. According to an empirical value, it may be expanded in the horizontal direction by 30 degrees, and in the vertical direction by 20 degrees, acquiring the following results:

The maximum field of vision in the horizontal direction in case of sideway vision of the human eyes is ($Yaw_{min}$−30, $Yaw_{max}$+30), The maximum field of vision in the vertical direction in case of sideway vision of the human eyes is ($Pitch_{min}$−20, $Pitch_{max}$+20).

Here, the human eye adjustment angle in the sideway vision scene may be set to 20 degrees, 25 degrees, etc., in the horizontal direction, and 15 degrees, 10 degrees, etc., in the vertical direction.

In S15, it is determined, according to the maximum field of vision, whether the target has a set behavior.

A yaw and a pitch of the face may be acquired.

Specifically, the three-dimensional pose of a face may be estimated as follows.

$$Pose_i = [yaw_i, pitch_i, roll_i]$$

The $Pose_i$ denotes the pose estimation result of estimating the pose of the i th face. The $yaw_i$, $pitch_i$, $roll_i$ denote the yaw, the pitch, and the roll of the i th face, respectively. The i denotes the face image in the i th image.

It may be determined, according to the yaw, the pitch, the maximum field of vision in the horizontal direction, and the maximum field of vision in the vertical direction, whether the target has the set behavior.

When the yaw is located in the maximum field of vision in the horizontal direction and the pitch is located in the maximum field of vision in the vertical direction, it may be determined that the target has the set behavior.

Of course, when the image includes multiple faces, it may be determined that the target has the set behavior when a target to which at least one of the multiple faces belongs has the set behavior.

Here, the set behavior includes a gaze at the target to be operated. That is, when it is determined that the user gazes at the target to be operated, a set behavior occurs, generating a corresponding operating instruction. The operating instruction is configured for adjusting the target to be operated to a first state. The first state may include at least one of an awake state or a power-on state.

For example, it is determined whether the operator (user) is gazing at the target to be operated, and if the operator is gazing at the target to be operated, an operating instruction is generated, adjusting the target to be operated to a first state. The first state may also be a state opposite to the current state. That is, when the target to be operated is currently in a sleep state and the operating instruction is a waking-up instruction, the state of the target to be operated may be adjusted to the awake state. When the target to be operated is currently in a power-off state and the operating instruction is a power-on instruction, the state of the target to be operated may be adjusted to the power-on state.

Specifically, it is possible to easily determine whether the face is gazing at a smart sound box according to the maximum field of vision in the horizontal direction and the maximum field of vision in the vertical direction in case of sideway vision, specifically as follows.

$$\begin{cases} Yaw_{min} - 30 <= yaw_i <= Yaw_{max} + 30 \\ Pitch_{min} - 20 <= pitch_i <= Pitch_{max} + 20 \end{cases}$$

The $yaw_i$ and the $pitch_i$ denote the yaw and the pitch of the three-dimensional pose estimation result of the ith face, respectively.

If the three-dimensional pose estimation result of the face in the i th image meets the above expression, it is determined that the face is gazing at the target to be operated, denoted as $s_i=1$. Otherwise, the face is not gazing at the target to be operated, that is, $s_i=0$. The $s_i$ denotes whether the face in the i th image is gazing at the target to be operated. The determination result indicating whether the target to which each face belongs is gazing at the target to be operated may form a set $S=\{s_1, s_2, \ldots, s_n\}$.

Determination results indicating whether the target to be operated is gazed at may be counted. There is at least a user who is gazing at the target to be operated if there is at least one face in all faces that is gazing at the target to be operated, i.e., there is at least one element greater than zero in the set S. Otherwise, it is considered that no user is gazing at the target to be operated.

In order to improve accuracy in determination in examples of the present disclosure, the determination condition may be modified as determining that an operator is gazing at the target to be operated and then generating a corresponding operating instruction when multiple consecutive elements greater than 0 exist in S. In this way, when the operator keeps gazing at the target to be operated, it may be determined that the operator is to operate the target to be operated, and a corresponding operating instruction may be generated.

In examples of the present disclosure, the operating instruction may be a waking-up instruction, a power-on instruction, etc. That is, an operating instruction is automatically generated corresponding to the current state of the target to be operated. For example, when the target to be operated is in the power-off state, if it is detected that the operator is gazing at the target to be operated, the power-on instruction is generated to turn on the target to be operated. When the target to be operated is in the sleep state, if it is detected that the operator is gazing at the target to be operated, a waking-up instruction is generated to wake up the target to be operated.

The technical solution of examples of the present disclosure is applicable to a scene in which a smart target to be operated, such as a voice robot, a smart speaker, etc., is smartly operated. Of course, the target to be operated may also be electronic equipment such as a mobile phone, a notebook, a tablet computer, a game machine, etc. After the user behavior recognition application of examples of the present disclosure is installed in the electronic equipment, an operating instruction may be generated corresponding to recognition of the user behavior, to operate the electronic equipment.

Figure 2:
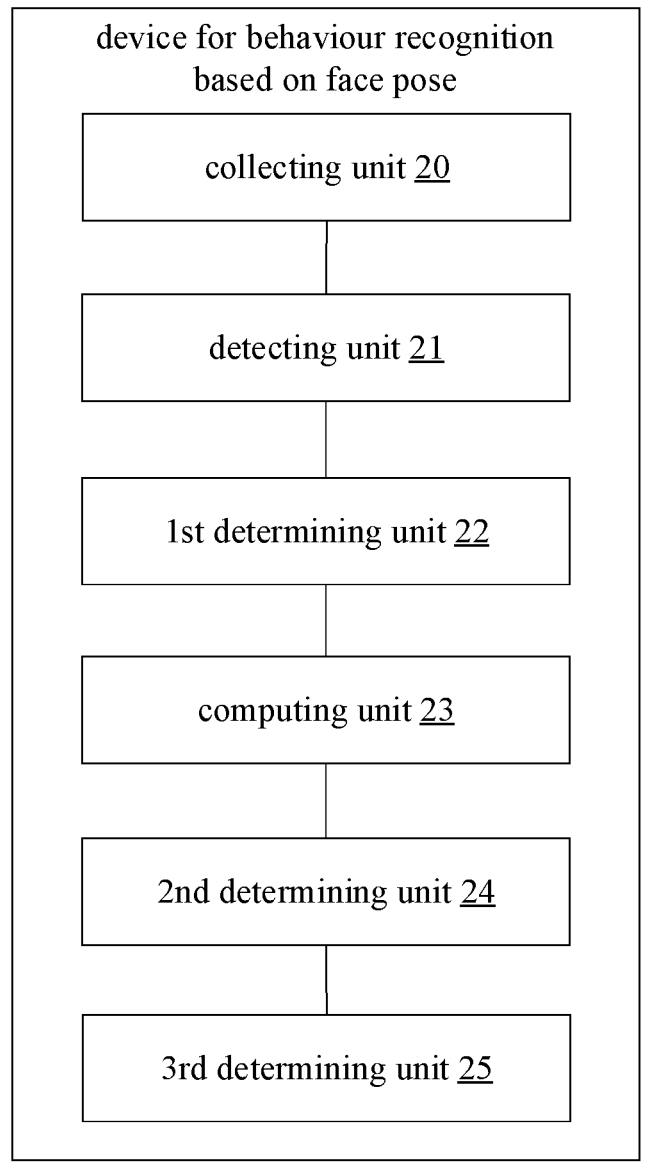
FIG. 2 is a schematic diagram of a structure of a device for behavior recognition according to one or more examples of the present disclosure.

FIG. 2 is a schematic diagram of a structure of a device for behavior recognition according to an example of the present disclosure. As shown in FIG. 2, As shown in FIG. 2, a device for behavior recognition according to an example of the present disclosure includes a unit as follow.

A collecting unit 20 is configured to collect an image.

A detecting unit 21 is configured to detect whether the image includes a face.

A first determining unit 22 is configured to, in response to the image including a face, determine whether the face in the image is a face with closed eyes.

A computing unit 23 is configured to, in response to the face in the image being not with closed eyes, compute a distance between the face and an image collecting unit.

A second determining unit 24 is configured to determine a maximum field of vision of a target to which the face belongs according to the distance and a parameter of the image collecting unit.

A third determining unit 25 is configured to determine whether the target has a set behavior according to the maximum field of vision.

As an implementation, the computing unit 23 is further configured to determine a size of a face image; and compute the distance between the face of the target and the image collecting unit based on the size of the face image and a resolution of a display unit of the image collecting unit.

As an implementation, the second determining unit is further configured to:

compute a field of view of the image collecting unit according to the parameter of the image collecting unit;

acquire location information of eyes of the face;

determine coordinate information of a midpoint of a line connecting pupils of a left eye and a right eye; and respectively compute a maximum field of vision of the target in a horizontal direction and a maximum field of vision of the target in a vertical direction based on the coordinate information, the size of the face, the field of view, a size of a target to be operated, and the distance.

As an implementation, the second determining unit 24 is further configured to:

expand the maximum field of vision in the horizontal direction by a first angular range; and expand the maximum field of vision in the vertical direction by a second angular range.

As an implementation, the third determining unit 25 is further configured to:

acquire a yaw and a pitch of the face; and determine, according to the yaw, the pitch, the maximum field of vision in the horizontal direction, and the maximum field of vision in the vertical direction, whether the target has the set behavior.

When the yaw is located in the maximum field of vision in the horizontal direction and the pitch is located in the maximum field of vision in the vertical direction, it may be determined that the target has the set behavior.

As an implementation, the third determining unit 25 is further configured to:

in response to the image including multiple faces, determine that the target has the set behavior in response to a target to which at least one of the multiple faces belongs having the set behavior.

As an implementation, the device further includes a generating unit.

The generating unit (not shown in FIG. 2) may be configured to generate an operating instruction in response to the target having the set behavior. The operating instruction may be configured for adjusting a target to be operated to a first state.

The first state may include at least one of an awake state or a power-on state.

In an illustrative example, the collecting unit 20, the detecting unit 21, the first determining unit 22, the computing unit 23, the second determining unit 24, the third determining unit 25, the generating unit, etc., may be implemented by one or more Central Processing Units (CPU), Graphics Processing Units (GPU), base processors (BP), Application Specific Integrated Circuits (ASIC), DSPs, Programmable Logic Devices (PLD), Complex Programmable Logic Devices (CPLD), Field-Programmable Gate Arrays (FPGA), general purpose processors, controllers, Micro Controller Units (MCU), Microprocessors, or other electronic components, or may be implemented in conjunction with one or more radio frequency (RF) antennas, for performing the foregoing device.

A module as well as unit of the device for behavior recognition according to an aforementioned example herein may perform an operation in a mode elaborated in an aforementioned example of the method herein, which will not be repeated here.

Figure 3:
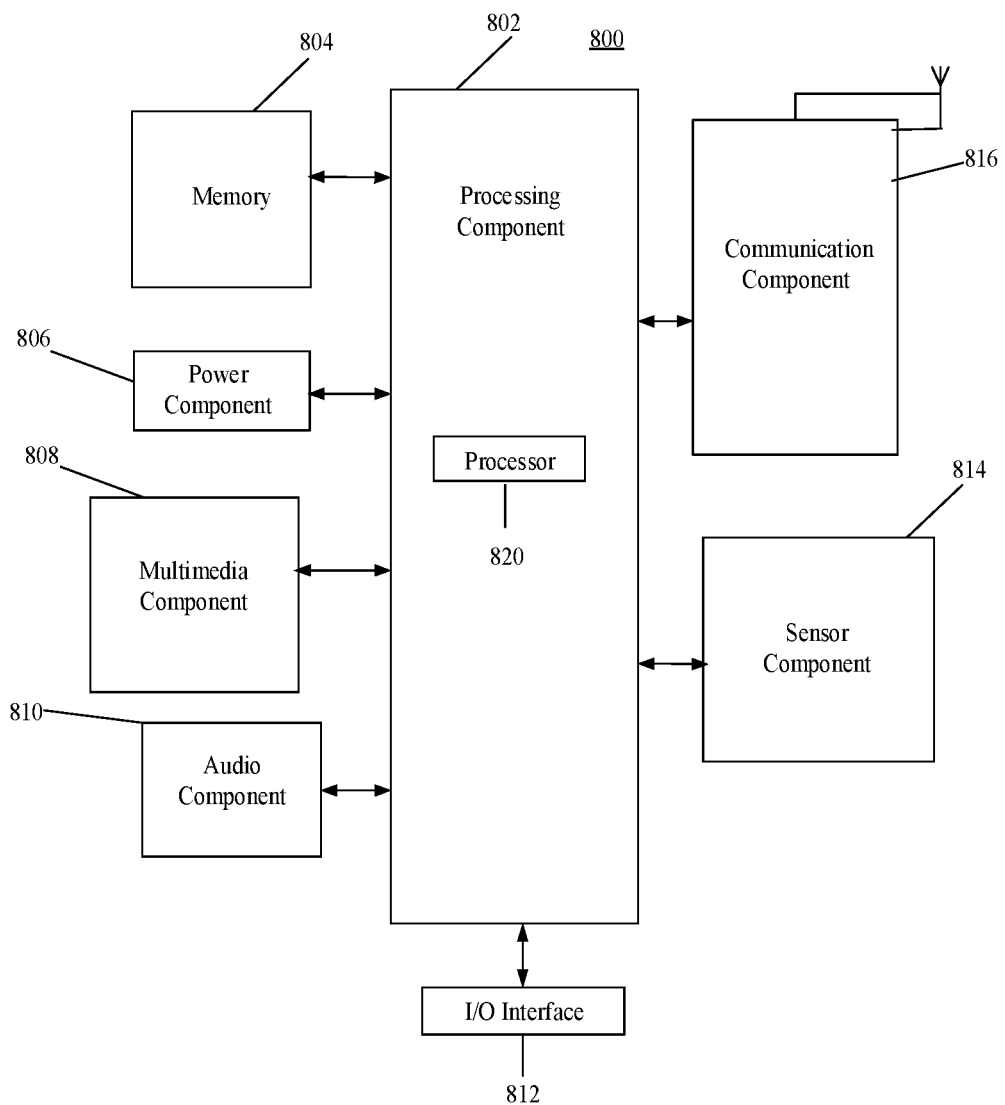
FIG. 3 is a block diagram of an electronic equipment according to one or more examples of the present disclosure.

FIG. 3 is a block diagram of electronic equipment 800 according to an illustrative example. As shown in FIG. 3, the electronic equipment 800 supports multi-screen output. The electronic equipment 800 may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the display equipment, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the electronic equipment 800. Examples of these data include instructions of any application or method configured to operate on the electronic equipment 800, contact data, phonebook data, messages, images, videos, and/or the like. The memory 804 may be realized by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the electronic equipment 800. The power component 806 may include a power management system, one or more power supplies, and other components related to generating, managing and distributing electric power for the electronic equipment 800.

The multimedia component 808 includes a screen providing an output interface between the electronic equipment 800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some examples, the multimedia component 808 includes a front camera and/or a rear camera. When the electronic equipment 800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the electronic equipment 800 is in an operation mode such as a call mode, a recording mode, and a voice recognition mode, the MIC is configured to receive an external audio signal. The received audio signal may be further stored in the memory 804 or may be sent via the communication component 816. In some examples, the audio component 810 further includes a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the electronic equipment 800. For example, the sensor component 814 may detect an on/off state of the electronic equipment 800 and relative locationing of components such as the display and the keypad of the electronic equipment 800. The sensor component 814 may further detect a change in the location of the electronic equipment 800 or of a component of the electronic equipment 800, whether there is contact between the electronic equipment 800 and a user, the orientation or acceleration/ deceleration of the electronic equipment 800, and a change in the temperature of the electronic equipment 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some examples, the sensor component 814 may further include an acceleration sensor, a gyroscope sensor, a magnetic sensor, a pressure sensor, or a temperature sensor.

The communication component 816 is configured to facilitate wired or wireless/radio communication between the electronic equipment 800 and other equipment. The electronic equipment 800 may access a radio network based on a communication standard such as WiFi, 2G, 3G, . . . , or a combination thereof. In an illustrative example, the communication component 816 broadcasts related information or receives a broadcast signal from an external broadcast management system via a broadcast channel. In an illustrative example, the communication component 816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an illustrative example, the electronic equipment 800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an illustrative example, a transitory or non-transitory computer-readable storage medium including instructions, such as the memory 804 including instructions, is further provided. The instructions may be executed by the processor 820 of the electronic equipment 800 to implement a step of the method for behavior recognition based on a face pose of an example herein. For example, the computer-readable storage medium may be a Read-Only Memory (ROM), a Random Access Memory (RAM), a Compact Disc Read-Only Memory (CD-ROM), a magnetic tape, a floppy disk, optical data storage equipment, etc.

Examples of the present disclosure further disclose anon-transitory computer-readable storage medium having stored therein instructions which, when executed by a processor of electronic equipment, allow the electronic equipment to implement a control method. The method includes:

collecting an image;

detecting whether the image includes a face;

in response to the image including a face, determining whether the face in the image is a face with closed eyes;

in response to the face in the image being not with closed eyes, computing a distance between the face and an image collecting unit; and determining a maximum field of vision of a target to which the face belongs according to the distance and a parameter of the image collecting unit; and determining whether the target has a set behavior according to the maximum field of vision.

Optionally, computing the distance between the face and the image collecting unit includes:

determining a size of a face image; and computing the distance between the face of the target and the image collecting unit based on the size of the face image and a resolution of a display unit of the image collecting unit.

Optionally, determining the maximum field of vision of the target to which the face belongs according to the distance and the parameter of the image collecting unit includes:

computing a field of view of the image collecting unit according to the parameter of the image collecting unit;

acquiring location information of eyes of the face;

determining coordinate information of a midpoint of a line connecting pupils of a left eye and a right eye; and respectively computing a maximum field of vision of the target in a horizontal direction and a maximum field of vision of the target in a vertical direction based on the coordinate information, the size of the face, the field of view, a size of a target to be operated, and the distance.

Optionally, the method further includes: after computing the maximum field of vision in the horizontal direction and the maximum field of vision in the vertical direction, expanding the maximum field of vision in the horizontal direction by a first angular range; and expanding the maximum field of vision in the vertical direction by a second angular range.

Optionally, the method further includes: before determining whether the target has the set behavior according to the maximum field of vision, acquiring a yaw and a pitch of the face.

Determining whether the target has the set behavior according to the maximum field of vision may include:

determining, according to the yaw, the pitch, the maximum field of vision in the horizontal direction, and the maximum field of vision in the vertical direction, whether the target has the set behavior.

When the yaw is located in the maximum field of vision in the horizontal direction and the pitch is located in the maximum field of vision in the vertical direction, it may be determined that the target has the set behavior.

Optionally, the method further includes:

in response to the image including multiple faces, determining that the target has the set behavior in response to a target to which at least one of the multiple faces belongs having the set behavior.

Optionally, the method further includes: generating an operating instruction in response to the target having the set behavior.

The operating instruction may be configured for adjusting a target to be operated to a first state.

Optionally, the first state includes at least one of an awake state or a power-on state.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the examples are intended to be illustrative only, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited only by the appended claims.

According to a first aspect of examples of the present disclosure, there is provided a method for behavior recognition, including:

collecting an image;

detecting whether the image includes a face;

in response to the image including a face, determining whether the face in the image is a face with closed eyes;

in response to the face in the image being not with closed eyes, computing a distance between the face and an image collecting unit; and determining a maximum field of vision of a target to which the face belongs according to the distance and a parameter of the image collecting unit; and determining whether the target has a set behavior according to the maximum field of vision.

Optionally, computing the distance between the face and the image collecting unit includes:

determining a size of a face image; and computing the distance between the face of the target and the image collecting unit based on the size of the face image and a resolution of a display unit of the image collecting unit.

Optionally, determining the maximum field of vision of the target to which the face belongs according to the distance and the parameter of the image collecting unit includes:

computing a field of view of the image collecting unit according to the parameter of the image collecting unit;

acquiring location information of eyes of the face;

determining coordinate information of a midpoint of a line connecting pupils of a left eye and a right eye; and respectively computing a maximum field of vision of the target in a horizontal direction and a maximum field of vision of the target in a vertical direction based on the coordinate information, the size of the face, the field of view, a size of a target to be operated, and the distance.

Optionally, the method further includes: after the maximum field of vision in the horizontal direction and the maximum field of vision in the vertical direction, expanding the maximum field of vision in the horizontal direction by a first angular range; and expanding the maximum field of vision in the vertical direction by a second angular range.

Optionally, the method further includes: before determining whether the target has the set behavior according to the maximum field of vision, acquiring a yaw and a pitch of the face.

Determining whether the target has the set behavior according to the maximum field of vision may include:

determining, according to the yaw, the pitch, the maximum field of vision in the horizontal direction, and the maximum field of vision in the vertical direction, whether the target has the set behavior.

When the yaw is located in the maximum field of vision in the horizontal direction and the pitch is located in the maximum field of vision in the vertical direction, it may be determined that the target has the set behavior.

Optionally, the method further includes:

in response to the image including multiple faces, determining that the target has the set behavior in response to a target to which at least one of the multiple faces belongs having the set behavior.

Optionally, the method further includes:

generating an operating instruction in response to the target having the set behavior. The operating instruction may be configured for adjusting a target to be operated to a first state.

Optionally, the first state includes at least one of an awake state or a power-on state.

According to a second aspect of examples of the present disclosure, there is provided a device for behavior recognition, including:

a collecting unit configured to collect an image;

a detecting unit configured to detect whether the image includes a face;

a first determining unit configured to, in response to the image including a face, determine whether the face in the image is a face with closed eyes;

a computing unit configured to, in response to the face in the image being not with closed eyes, compute a distance between the face and an image collecting unit;

a second determining unit configured to determine a maximum field of vision of a target to which the face belongs according to the distance and a parameter of the image collecting unit; and a third determining unit configured to determine whether the target has a set behavior according to the maximum field of vision.

Optionally, the computing unit is further configured to determine a size of a face image; and compute the distance between the face of the target and the image collecting unit based on the size of the face image and a resolution of a display unit of the image collecting unit.

Optionally, the second determining unit is further configured to:

compute a field of view of the image collecting unit according to the parameter of the image collecting unit;

acquire location information of eyes of the face;

determine coordinate information of a midpoint of a line connecting pupils of a left eye and a right eye; and respectively compute a maximum field of vision of the target in a horizontal direction and a maximum field of vision of the target in a vertical direction based on the coordinate information, the size of the face, the field of view, a size of a target to be operated, and the distance.

Optionally, the second determining unit is further configured to:

expand the maximum field of vision in the horizontal direction by a first angular range; and expand the maximum field of vision in the vertical direction by a second angular range.

Optionally, the third determining unit is further configured to:

acquire a yaw and a pitch of the face; and determine, according to the yaw, the pitch, the maximum field of vision in the horizontal direction, and the maximum field of vision in the vertical direction, whether the target has the set behavior.

When the yaw is located in the maximum field of vision in the horizontal direction and the pitch is located in the maximum field of vision in the vertical direction, it may be determined that the target has the set behavior.

Optionally, the third determining unit is further configured to:

in response to the image including multiple faces, determine that the target has the set behavior in response to a target to which at least one of the multiple faces belongs having the set behavior.

Optionally, the device further includes a generating unit configured to generate an operating instruction in response to the target having the set behavior.

The operating instruction may be configured for adjusting a target to be operated to a first state.

The first state may include at least one of an awake state or a power-on state.

According to a third aspect of examples of the present disclosure, there is provided electronic equipment including a processor and a memory for storing processor executable instructions. The processor is configured to implement a step of the method for behavior recognition by calling the executable instructions in the memory.

According to a fourth aspect of examples of the present disclosure, there is provided a non-transitory computer-readable storage medium having stored therein instructions which, when executed by a processor of electronic equipment, allow the electronic equipment to implement a step of the method for behavior recognition.

A technical solution provided by examples of the present disclosure may include beneficial effects as follows.

In examples of the present disclosure, an image is collected. It is detected whether the image includes a face. When the image includes a face, it is determined whether the face in the image is a face with closed eyes. When the face in the image is not with closed eyes, a distance between the face and an image collecting unit is computed. A maximum field of vision of a target to which the face belongs is determined according to the distance and a parameter of the image collecting unit. It is determined, according to the maximum field of vision, whether the target has a set behavior. With examples of the present disclosure, a user behavior is detected accurately, with great control accuracy, ensuring reliability of human-computer interaction based on the user behavior.

What is claimed is:

1. A method for behavior recognition, comprising:
collecting an image, by a camera;
detecting whether the image comprises a face;
in response to the image comprising a face, determining whether the face in the image is a face with closed eyes, wherein the face in the image is a face of a target;
in response to determining that the face in the image is not with closed eyes, computing a distance between the face and the camera, comprising:
determining a size of a face image; and
computing the distance between the face of the target and the camera based on the size of the face image and a resolution of a display of the camera;
determining a maximum field of vision of the target according to the distance and a parameter of the camera, comprising:
computing a field of view of the camera according to the parameter of the camera, wherein the parameter of the camera comprises a focal length of the camera, a physical height of a sensor of the camera and a physical width of the sensor of the camera;
acquiring a location of eyes of the face;
determining a coordinate of a midpoint of a line connecting pupils of a left eye and a right eye; and respectively computing a maximum field of vision of the target in a horizontal direction and a maximum field of vision of the target in a vertical direction based on the coordinate, the size of the face, the field of view, a size of a target to be operated, and the distance; and
determining whether the target has a set behavior according to the maximum field of vision.

2. The method of claim 1, further comprising:
expanding the maximum field of vision in the horizontal direction by a first angular range; and
expanding the maximum field of vision in the vertical direction by a second angular range.

3. The method of claim 1, further comprising:
acquiring a yaw and a pitch of the face; and
wherein determining whether the target has the set behavior according to the maximum field of vision comprises:
determining, according to the yaw, the pitch, the maximum field of vision in the horizontal direction, and the maximum field of vision in the vertical direction, whether the target has the set behavior,
wherein in response to the yaw being located in the maximum field of vision in the horizontal direction and the pitch being located in the maximum field of vision in the vertical direction, the target is determined to have the set behavior.

4. The method of claim 1, further comprising:
in response to the image comprising multiple faces of multiple targets, determining that the target has the set behavior in response to at least one of the multiple targets having the set behavior.

5. The method of claim 1, further comprising:
generating an operating instruction in response to the target having the set behavior, the operating instruction being configured to adjust a target to be operated to a first state.

6. The method of claim 5, wherein the first state comprises at least one of:
an awake state, or a power-on state.

7. An electronic equipment comprising: a processor and a memory for storing processor executable instructions, wherein the processor is configured, by calling the executable instructions in the memory, to implement:
collecting an image, by a camera of the electronic equipment;
detecting whether the image comprises a face;
in response to the image comprising a face, determining whether the face in the image is a face with closed eyes, wherein the face in the image is a face of a target;
in response to determining that the face in the image is not with closed eyes, computing a distance between the face and the camera;
determining a maximum field of vision of a target to which the face belongs according to the distance and a parameter of the camera; and
determining whether the target has a set behavior according to the maximum field of vision,
wherein the processor is configured to compute the distance between the face and the camera by:
determining a size of a face image; and
computing the distance between the face of the target and the camera based on the size of the face image and a resolution of a display of the camera; and wherein the processor is configured to determine the maximum field of vision of the target to which the face belongs according to the distance and the parameter of the camera by:
computing a field of view of the camera according to the parameter of the camera, wherein the parameter of the camera comprises a focal length of the camera, a physical height of a sensor of the camera and a physical width of the sensor of the camera;
acquiring a location of eyes of the face;
determining a coordinate of a midpoint of a line connecting pupils of a left eye and a right eye; and
respectively computing a maximum field of vision of the target in a horizontal direction and a maximum field of vision of the target in a vertical direction based on the coordinate, the size of the face, the field of view, a size of a target to be operated, and the distance.

8. The electronic equipment of claim 7, wherein the processor is further configured to implement:
expanding the maximum field of vision in the horizontal direction by a first angular range; and
expanding the maximum field of vision in the vertical direction by a second angular range.

9. The electronic equipment of claim 7, wherein the processor is further configured to implement:
acquiring a yaw and a pitch of the face; and
wherein the processor is configured to determine whether the target has the set behavior according to the maximum field of vision by:
determining, according to the yaw, the pitch, the maximum field of vision in the horizontal direction, and the maximum field of vision in the vertical direction, whether the target has the set behavior,
wherein in response to the yaw being located in the maximum field of vision in the horizontal direction and the pitch being located in the maximum field of vision in the vertical direction, the target is determined to have the set behavior.

10. The electronic equipment of claim 7, wherein the processor is further configured to implement:
in response to the image comprising multiple faces of multiple targets, determining that the target has the set behavior in response to at least one of the multiple targets having the set behavior.

11. The electronic equipment of claim 7, wherein the processor is further configured to implement:
generating an operating instruction in response to the target having the set behavior,
the operating instruction being configured to adjust a target to be operated to a first state.

12. The electronic equipment of claim 11, wherein the first state comprises at least one of:
an awake state, or a power-on state.

13. A non-transitory computer-readable storage medium having stored therein instructions which, when executed by a processor of electronic equipment, allow the electronic equipment to implement:
collecting an image, by a camera;
detecting whether the image comprises a face;
in response to the image comprising a face, determining whether the face in the image is a face with closed eyes, wherein the face in the image is a face of a target;
in response to determining that the face in the image is not with closed eyes, computing a distance between the face and the camera;
determining a maximum field of vision of the target according to the distance and a parameter of the camera; and
determining whether the target has a set behavior according to the maximum field of vision,
wherein computing the distance between the face and the camera comprises:
determining a size of a face image; and
computing the distance between the face of the target and the camera based on the size of the face image and a resolution of a display of the camera; and
wherein determining the maximum field of vision of the target according to the distance and the parameter of the camera comprises:
computing a field of view of the camera according to the parameter of the camera, wherein the parameter of the camera comprises a focal length of the camera, a physical height of a sensor of the camera and a physical width of the sensor of the camera;
acquiring a location of eyes of the face;
determining a coordinate of a midpoint of a line connecting pupils of a left eye and a right eye; and
computing a maximum field of vision of the target in a horizontal direction and a maximum field of vision of the target in a vertical direction based on the coordinate, the size of the face, the field of view, a size of a target to be operated, and the distance.

14. The storage medium of claim 13, wherein the instructions further allow the electronic equipment to implement:
expanding the maximum field of vision in the horizontal direction by a first angular range; and
expanding the maximum field of vision in the vertical direction by a second angular range.

* * * * *